United States Patent Office 3,488,375
Patented Jan. 6, 1970

3,488,375
STABILIZED METHYL ISOCYANATE
COMPOSITIONS
Duane Howard Parker, South Charleston, W. Va., assignor to Union Carbide Corporation, a corporation of New York
No Drawing. Filed May 29, 1967, Ser. No. 642,151
Int. Cl. C07c 119/04, 125/06
U.S. Cl. 260—453     6 Claims

ABSTRACT OF THE DISCLOSURE

Methyl isocyanate, especially when contaminated with methylcarbamoyl chloride, is stabilized against steel-catalyzed trimer and polymer formation by dissolving in it from 0.005 to 0.40 percent by weight of a dialkyl acid pyrophosphate, preferably about 0.02 percent of dimethyl acid pyrophosphate.

---

Methyl isocyanate is an important chemical intermediate used in the manufacture of carbamate insecticides and other commercial chemicals. One difficulty inherent in its use is its instability in steel containers in which it might be normally shipped; methyl isocyanate has been found to react with itself in the presence of steel to form a trimer which renders it unfit for use as an intermediate. The problem appears to be aggravated when there are present in the methyl isocyanate small amounts of methylcarbamoyl chloride which may be carried over into the product when methyl isocyanate is manufactured by the known reaction of phosgene and methylamine. The trimerization of methyl isocyanate in a steel container proceeds at a dangerously rapid rate when it is contaminated with traces of methylcarbamoyl chloride. If the container is closed, the sudden pressure build-up associated with the reaction can lead to explosions.

Despite the commercial importance of methyl isocyanate and the severity of the trimerization problem, no satisfactory way to inhibit the trimerization reaction had been found prior to this invention. It had been attempted to employ inhibitors known to successfully stabilize tolylene diisocyanate which was thought chemically similar to methyl isocyanate in this regard. However, substances such as benzoyl chloride, acetic anhydride, acetyl chloride, and triphenyl phosphite, which inhibit the polymerization of tolylene diisocyanate, were found ineffective when used to stabilize methyl isocyanate.

Since trace amounts of hydrogen chloride (in the form of methylcarbamoyl chloride) were thought partly responsible for trimerization, several acid-accepting materials were tried as stabilizers. Many of the well-known acid acceptors, such as pyridine, were found not only to be ineffective as stabilizers but to actually catalyze the polymerization of methyl isocyanate, even in the absence of steel. Other acid acceptors, such as calcium carbonate and calcium oxide, did not catalyze a polymerization reaction but did not inhibit trimer formation in the presence of steel for significant periods of time.

It has now been discovered that small amounts of dialkyl acid pyrophosphate effectively stabilize methyl isocyanate against trimerization in the presence of steel. Effective stabilizing quantities of dialkyl acid pyrophosphate range from about 0.005 to 0.40, based on methyl isocyanate. Below 0.005 percent little stabilizing effect was noted; the solubility of dimethyl acid pyrophosphate in methyl isocyanate imposes the upper limit of 0.40 percent. Preferably, from 0.005 to 0.040 percent of stabilizer is used in that effective stabilization is achieved at these concentrations without undue product contamination. Generally, about 0.020 percent of stabilizer, based on methyl isocyanate, has been found sufficient when using dimethyl acid pyrophosphate in stabilizing methyl isocyanate of typical methylcarbamoyl chloride content. Higher amounts may be necessary when using the higher homologs of dimethyl acid pyrophosphate or when unusually severe stabilization problems exist, i.e. when the methyl isocyanate contains unusually large amounts of methylcarbamoyl chloride or when an exceptionally large steel surface is exposed to the methyl isocyanate. When using dibutyl acid pyrophosphate, amounts ranging from 0.1 to 0.5 percent have been found satisfactory under usual conditions.

The dialkyl acid pyrophosphate compounds used as stabilizers in this invention are reaction products of phosphorous pentoxide with a given alkanol, according to the following reaction:

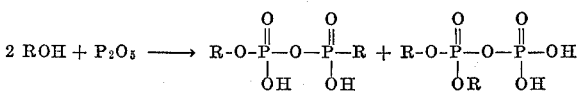

where R is alkyl containing from 1 to 4 carbon atoms, i.e. methyl, ethyl, propyl or butyl.

It was found that dialkyl acid pyrophosphates in which the alkyl groups contain more than 4 carbon atoms each were substantially ineffective as stabilizers, so that the carbon atom content of the R group is critical. It was further found that somewhat higher concentrations of the higher homologs of the stabilizer species (i.e. R=3 to 4 carbon alkyl) were required for effective stabilization than with the lower homologs (i.e. R=methyl or ethyl). The two R groups in the pyrophosphate molecule may be alike or different, those with different R groups being prepared by using a mixture of the appropriate starting alcohols and separating the desired products by fractional distillation.

The dialkyl acid pyrophosphates used in this invention are commercially available. Commercial materials may contain some phosphorous pentoxide as well as acid phosphate esters formed when the P—O—P bond is broken, e.g., when excess alcohol is used. However, commerical material, such as that available from Stauffer Chemical Company, has been found satisfactory for stabilizing purposes.

Dimethyl acid pyrophosphate is quite water soluble but oil insoluble. To determine its solubility in methyl isocyanate, mixtures of the two materials were prepared, the insolubles were allowed to settle, and the supernatant solution analyzed for dimethyl acid pyrophosphate. When 50 grams of methyl isocyanate were mixed with (a) 0.5 gram and (b) 0.2 gram of dimethyl acid pyrophosphate, the supernatant liquid contained (a) 0.40 and (b) 0.10 percent by weight of dimethyl acid pyrophosphate. Accordingly, it is apparent that the quantities of dimethyl acid pyrophosphate which are optimum for stabilization purposes are readily soluble in methyl isocyanate. It is important to avoid the addition of large amounts of dimethyl pyrophosphate to methyl isocyanate, however, as an exothermic reaction takes place which causes the reaction mixture to boil. If the methyl isocyanate is confined, rapid vapor formation can cause an explosion. The higher homologs of dimethyl acid pyrophosphate are easily soluble in methyl isocyanate so that no difficulty is experienced in dissolving the quantities needed for effective stabilization.

The relative efficacy of the dialkyl acid pyrophosphates as stabilizers were determined in a series of experiments as follows. Solutions of methylcarbamoyl chloride in commerical grade methyl isocyanate were prepared, to simulate the composition of methyl isocyanate reaction product when made by the aforementioned methylamine/phosgene synthesis. The indicated amounts of stabilizer were then added and the resulting mixtures held in glass bottles for forty days at room temperature. The results are set forth in Table I, below.

TABLE I

Performance of candidate stabilizers in methyl isocyanate

| Test Stabilizer | Observations |
|---|---|
| Dimethyl acid pyrophosphate | After 40 days, no change in appearance; trimer analysis: nil. |
| Sodium salt of alkyl pyrophosphoric acid[1] | After 40 days, 8.35 percent trimer. |
| Pyridine | A white polymeric solid (probably a polyurea) plated out on the glass surface; after 40 days, 4.7 percent trimer. |

[1] "Victawet 35B" sold by Stauffer Chemical Company.

In commercial operation, methyl isocyanate is usually contained in steel vessels and it is therefore especially important that a stabilizer be effective when the methyl isocyanate is exposed to a steel surface, since steel is known to induce trimer formation. A second series of experiments was carried out to determine the efficacy of candidate stabilizers under these conditions. Solutions of freshly distilled methylcarbamoyl chloride (0.105 percent by weight) in commercial methyl isocyanate were prepared, the indicated amount of stabilizer was added, and 100 grams of the mixture exposed to two steel coupons having a total surface of 6.5 square inches in a glass bottle. This surface is proportionately much greater than that to which methyl isocyanate would be exposed in commercial operation. A control test using no stabilizer was run side-by-side and the results were expressed in terms of an "inhibition factor," defined as the ratio of the times required for formation of tirmer crystals with and without stabilizer present. Table II sets forth the results.

TABLE II.—PERFORMANCE OF DIMETHYL ACID PYROPHOSPHATE IN METHYL ISOCYANATE/METHYLCARBAMOYL CHLORIDE IN THE PRESENCE OF STEEL

| Concentration (weight percent) | Exposure Time (days) | Inhibition Factor | Observations* |
|---|---|---|---|
| 0.22 | 0 | | Cloudy and colorless at start. |
| | 43 | | Nil trimer. |
| | 108 | | 0.09% trimer. |
| | 143 | | Very pale green. |
| | 204 | | 0.90% trimer. |
| | 306 | | Yellow-green mixture. |
| | 405 | 270 | Trimer crystals. |
| 0.022 | 0 | | Cloudy and colorless at start. |
| | 23 | | .04% trimer. |
| | 43 | | Faint green. |
| | 58 | | 1.24% trimer. |
| | 88 | 66 | Trimer crystals. |
| 0.0022 | 0 | | Clear and colorless at start. |
| | 14 | | Nil trimer. |
| | 27 | | Pale green. |
| | 34 | 26 | Brown color followed by rapid trimer formation. |

*Trimer crystallizes from methyl isocyanate when its concentration reaches approximately 20 percent. Without added stabilizer, such crystallization takes place in about 36 hours at 0.105 percent methylcarbamoyl chloride.

A similar series of experiments was run using dibutyl acid pyrophosphate as the stabilizer in a concentration of 0.10 percent, based on methyl isocyanate, at different methylcarbamoyl chloride levels. The results are set forth in Table III.

TABLE III.—PERFORMANCE OF DIBUTYL ACID PYROPHOSPHATE IN METHYL ISOCYANATE/METHYLCARBAMOYL CHLORIDE IN THE PRESENCE OF STEEL

| Methylcarbamoyl Chloride Concentration (weight percent) | Exposure Time (days) | Inhibition Factor | Observations* |
|---|---|---|---|
| 0.007 | 127 | | Clear and colorless 0.22% trimer. |
| | 163 | | Clear and colorless. |
| | 521 | 45 | Trimer crystals. |
| 0.01 | 127 | | Clear and colorless 0.32% trimer. |
| | 157 | | Clear and colorless 0.31% trimer. |
| | 163 | | No change. |
| | 288 | 100 | Trimer crystals. |

*Without added stabilizer, trimer crystals formed after about 11.5 days (0.007 percent methylcarbamoyl chloride) or 2.8 days (0.01 percent methylcarbamoyl chloride).

Similar tests using di(2-ethylhexyl) acid pyrophosphate, even at a concentration of as high as 0.33 weight percent, resulted in trimer crystal formation in a few days, with inhibition factors only slightly above 1. At 0.022 percent of the di(2-ethylhexyl) material, trimer crystal formation occurred after 26–42 hours and the inhibition factor was 1. Accordingly, use of the specific compounds encompassed in this invention is critical to success.

The use of materials such as calcium carbonate, triphenyl phosphite, and a mixture of amine salts of dialkyl acid pyrophosphate (which is sold as a commercial corrosion inhibitor) led to complete, sometimes violent, trimerization after periods ranging from a few hours to a few days when used under conditions comparable to those described above.

What is claimed is:

1. Stabilized methyl isocyanate compositions comprising methyl isocyanate and from 0.005 to 0.40 percent by weight, based on isocyanate, of a dialkyl acid pyrophosphate wherein each alkyl group contains not more than four carbon atoms.

2. The composition of claim 1 wherein the dialkyl acid pyrophosphate concentration is dimethyl acid pyrophosphate.

3. The composition of claim 2 wherein the dimethyl acid pyrophosphate concentrate is about 0.020 percent.

4. The compositions of claim 1 wherein small amounts of methylcarbamoyl chloride are present.

5. The composition of claim 1 wherein the dialkyl acid pyrophosphate is dibutyl acid pyrophosphate.

6. The composition of claim 5 wherein the dibutyl acid pyrophosphate concentration is about 0.2 percent.

References Cited

UNITED STATES PATENTS

| 2,909,558 | 10/1959 | Reetz | 260—453 XR |
| 3,168,554 | 2/1965 | Phillips et al. | 260—933 XR |
| 3,264,353 | 8/1966 | Powers | 260—453 XR |

OTHER REFERENCES

Riley: Chemical Abstracts, vol. 51, p. 12,386 (1957).

CHARLES B. PARKER, Primary Examiner

DOLPH H. TORRENCE, Assistant Examiner

U.S. Cl. X.R.

260—248, 482, 544, 933, 999